(12) United States Patent
White

(10) Patent No.: US 8,827,586 B2
(45) Date of Patent: Sep. 9, 2014

(54) DAMPING MECHANICAL LINKAGE

(75) Inventor: Edward V. White, St. Charles, MO (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 13/534,938

(22) Filed: Jun. 27, 2012

(65) Prior Publication Data

US 2014/0001310 A1    Jan. 2, 2014

(51) Int. Cl.
F16F 7/00    (2006.01)

(52) U.S. Cl.
USPC ................ 403/220; 244/17.27; 248/599

(58) Field of Classification Search
USPC ......... 403/120, 149, 166, 220, 225, 227, 364; 248/554–557, 580, 599, 602; 174/42; 188/378–380; 244/17.11, 17.27, 27.54, 244/173.2; 267/294; 416/140; 52/1, 167.1, 52/167.4, 167.7, 167.8
See application file for complete search history.

(56) References Cited

U.S. PATENT DOCUMENTS

| | | | | |
|---|---|---|---|---|
| 2,165,375 A | * | 7/1939 | Heitner | 213/44 |
| 2,239,319 A | * | 4/1941 | Halford et al. | 248/634 |
| 2,284,985 A | * | 6/1942 | Piron | 105/224.1 |
| 2,328,614 A | * | 9/1943 | Busse | 267/141.1 |
| 2,356,246 A | * | 8/1944 | Jones | 267/294 |
| 2,365,421 A | * | 12/1944 | Lord | 248/556 |
| 3,575,403 A | * | 4/1971 | Hamel et al. | 267/294 |
| 4,504,193 A | * | 3/1985 | Mouille | 416/140 |
| 4,727,695 A | * | 3/1988 | Kemeny | 52/167.8 |
| 4,761,925 A | * | 8/1988 | Fukahori et al. | 52/167.7 |
| 4,978,581 A | * | 12/1990 | Fukahori et al. | 428/492 |
| 5,332,070 A | | 7/1994 | Davis et al. | |
| 5,407,325 A | * | 4/1995 | Aubry | 416/106 |
| 6,135,224 A | * | 10/2000 | Thomas et al. | 180/78 |
| 6,659,438 B2 | * | 12/2003 | Michael et al. | 267/294 |
| 6,799,400 B2 | * | 10/2004 | Chuang | 52/167.1 |
| 7,549,257 B2 | * | 6/2009 | Chuang | 52/167.1 |
| 7,909,285 B2 | * | 3/2011 | Dron et al. | 244/54 |
| 8,070,143 B2 | * | 12/2011 | Wietharn | 267/141.4 |
| 8,341,893 B2 | * | 1/2013 | Jen | 52/167.4 |
| 2008/0307722 A1 | * | 12/2008 | Christopoulos et al. | 52/167.1 |
| 2012/0260585 A1 | * | 10/2012 | Mualla | 52/167.1 |

FOREIGN PATENT DOCUMENTS

| | | | | |
|---|---|---|---|---|
| EP | 1568913 | | 8/2005 | |
| GB | 1371774 | | 10/1974 | |
| JP | 01029538 A | * | 1/1989 | 52/167.7 |
| JP | 06212833 A | * | 8/1994 | 52/167.1 |
| WO | WO0071840 | | 11/2000 | |

OTHER PUBLICATIONS

International Search Report for PCT/US2013/042768; Patent Cooperaiton Treaty Oct. 14, 2013.

* cited by examiner

Primary Examiner — Michael P Ferguson
Assistant Examiner — Matthieu Setliff
(74) Attorney, Agent, or Firm — Parsons Behle & Latimer

(57) ABSTRACT

A mechanical linkage includes first and second end members and a pair of generally parallel arcuate beams, interconnecting the end members and defining a lateral space therebetween. A plurality of alternating fingers extend from each beam into the lateral space, and a damping member is attached between each adjacent pair of fingers within the lateral space.

18 Claims, 7 Drawing Sheets

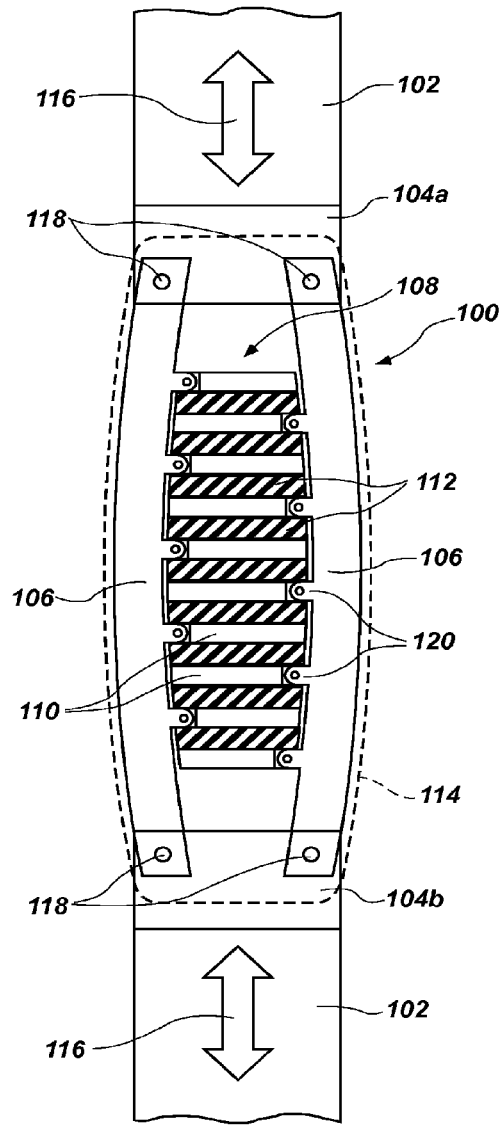 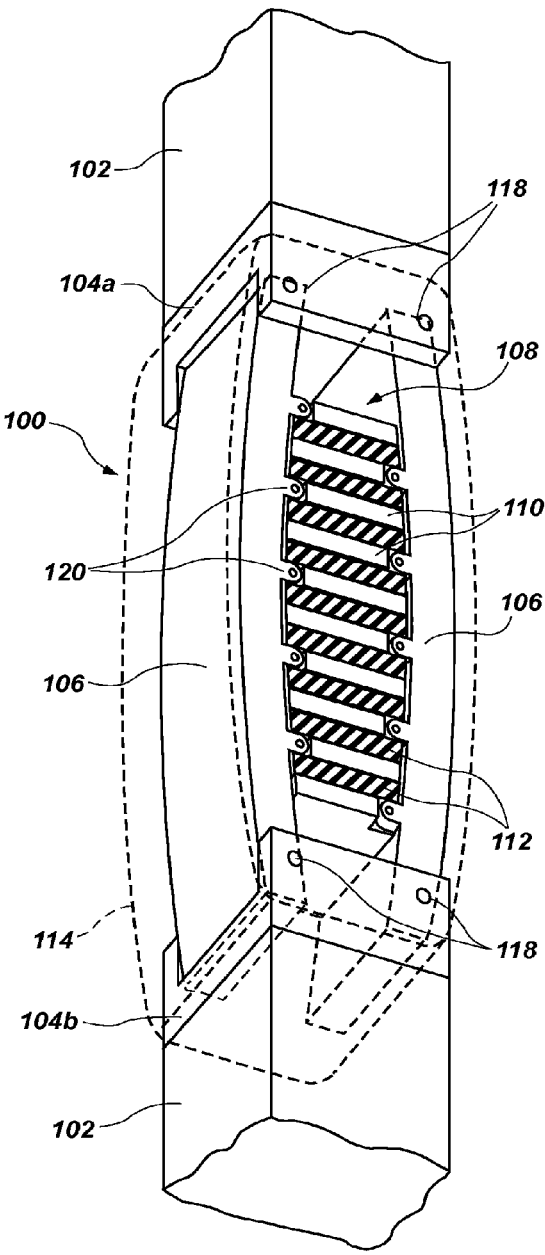
FIG. 1　　　　FIG. 2

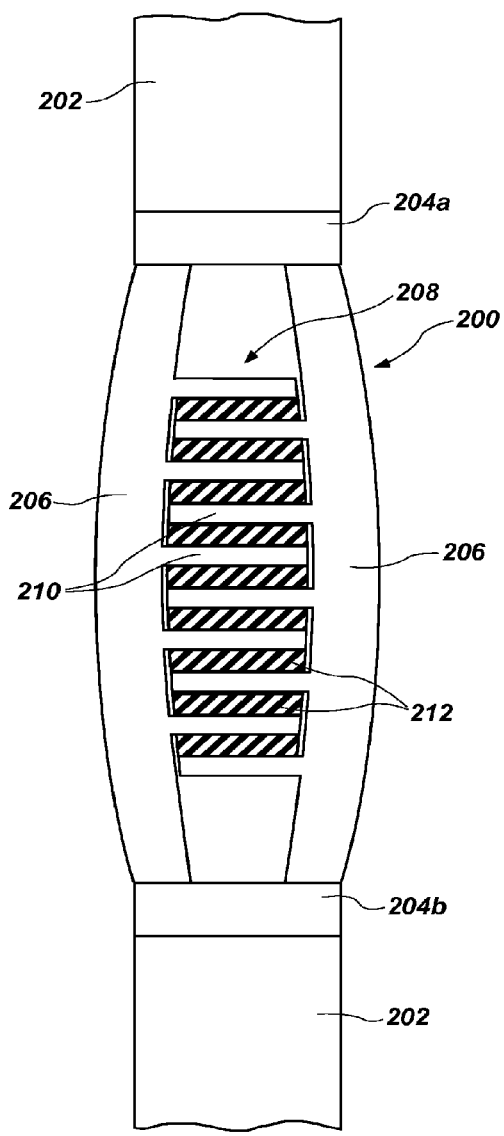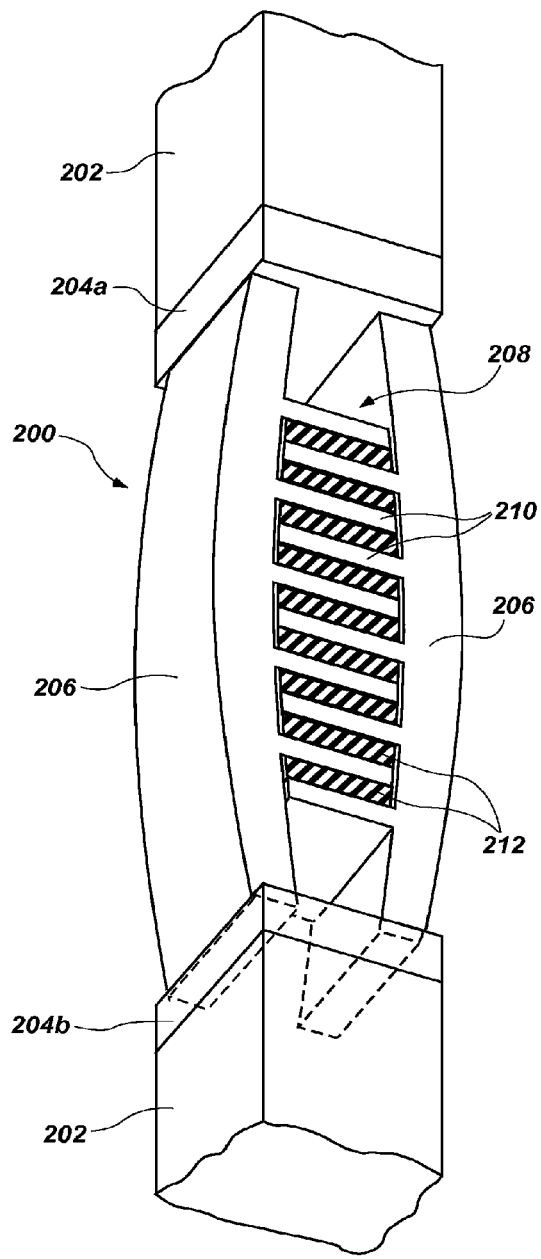
FIG. 3  FIG. 4

DAMPING MECHANICAL LINKAGE

GOVERNMENT-SPONSORED RESEARCH

This invention was made with United States Government support under NextGen Aeronautics PO 10-14/Sales Order 3047 awarded under the Structural Logic Program sponsored by the Defense Advanced Research Projects Agency. The United States Government may have certain rights in this invention.

FIELD

The present disclosure relates to mechanical linkages. More particularly, the present disclosure relates to a mechanical linkage that has high stiffness and high damping. This linkage can be used in aircraft and other applications in which such characteristics are desirable.

BACKGROUND

The statements in this section merely provide background information related to the present disclosure and may not constitute prior art.

There are a variety of situations in which it is desirable to have structural members with both high stiffness and high energy damping characteristics. For example, modern fixed-wing and rotary-wing aircraft include control mechanisms that experience both high stress and significant vibrational forces. These can include actuators for control surfaces, for example. While it is desirable to dampen vibrational forces, materials and members that are effective at energy damping often have low mechanical stiffness, making them unsuitable for the forces of the particular member. Most materials have either high stiffness or high damping, but not both. High stiffness materials, such as steel, by themselves are very poor at damping vibrational forces.

There are a variety of types of damping mechanisms that have been developed for use in machines and parts that experience vibrational and impact forces, such as engines, aircraft, etc. Many of these, however, are relatively complicated and/or expensive. High damping may be provided by the addition of dampers (which sometimes have limited effectiveness) or by active closed-loop control. For example, some known damping devices use a fluid, and include bellows and seals, and thus present the possibility for leaks. Many damping mechanisms that are known include a large number of parts and may involve significant maintenance, or they may involve exotic or expensive materials.

The present disclosure is directed toward one or more of the above-mentioned issues.

SUMMARY

In one embodiment, the present disclosure provides a mechanical linkage having first and second end members and a pair of generally parallel beams, interconnecting the end members and defining a lateral space therebetween. A plurality of alternating fingers extend from each beam into the lateral space, and a damping member is attached between each adjacent pair of fingers within the lateral space.

In one specific embodiment, the damping member comprises an elastomer.

In another specific embodiment, the beams are shaped to cause a deflection in a predetermined direction when under axial load.

In another specific embodiment, the beams define oppositely oriented arcs having a chord ratio of from about 0.03 to about 0.10.

In one embodiment, the beams are pinned to the end members, while in another specific embodiment, the beams, fingers and end members are integrally formed.

In another specific embodiment, the end members, beams and fingers are of a material selected from the group consisting of steel, titanium, aluminum, and alloys thereof, fiberglass epoxy, carbon fiber composite and combinations of any of the above. In various embodiments, the beams can have a cross-section of a flat bar, a channel, an angle and a box beam.

In accordance with another embodiment, the present disclosure provides an aerospace vehicle having a structural member, adapted to be subject to axial stress and vibration. A damping linkage is provided within the structural member, and includes first and second end members and a pair of oppositely oriented arcuate beams, interconnecting the end members and defining a lateral space therebetween. A plurality of alternating fingers extend from each arcuate beam, and a damping member is bonded between adjacent fingers in the lateral space.

In accordance with yet another embodiment, the present disclosure provides a method of making a damping structural member of an aircraft system. The method includes attaching a pair of oppositely curved arcuate beams between end members of a damping linkage and attaching at least one finger to each arcuate beam. The fingers extend into a lateral space between the pair of beams in an alternating, interleaved configuration, and a viscoelastic damping member is attached between the fingers.

In one specific embodiment, the method includes providing a cover around the beams, the fingers and the damping members.

The features, functions and advantages that have been discussed can be achieved independently in various embodiments or may be combined in yet other embodiments, further details of which can be seen with reference to the following description and drawings.

BRIEF DESCRIPTION OF THE DRAWINGS

The drawings described herein are for illustration purposes only and are not intended to limit the scope of the present disclosure in any way.

FIG. 1 is a front view of an embodiment of a damping mechanical linkage in accordance with the present disclosure having pinned connections of the arched beams and transverse fingers;

FIG. 2 is a perspective view of the damping mechanical linkage of FIG. 1;

FIG. 3 is a front view of an embodiment of a damping mechanical linkage in accordance with the present disclosure wherein the arched beams and fingers are integrally attached to the end members;

FIG. 4 is a perspective view of the damping mechanical linkage of FIG. 3;

DETAILED DESCRIPTION

Figure 5:
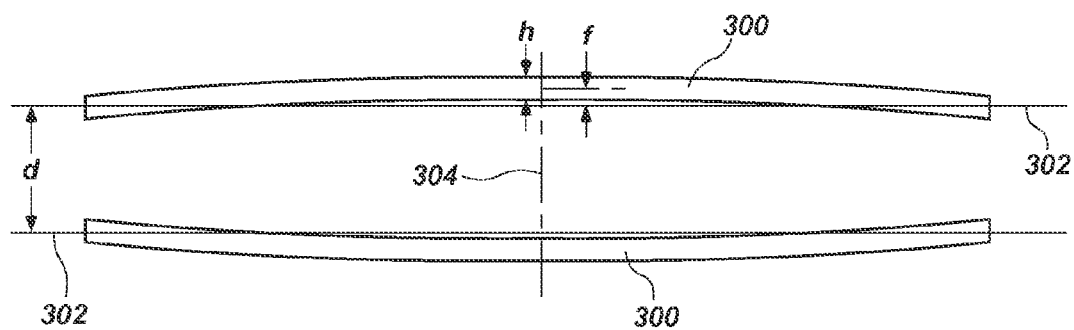
FIG. 5 is a diagram illustrating the parameters that define the arch rise of the arched beams.

Illustrative embodiments are described below as they might be employed in a mechanical linkage with high stiffness and high damping. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Further aspects and advantages of the various embodiments will become apparent from consideration of the following description and drawings. These embodiments are described in sufficient detail to enable those skilled in the art to practice the invention, and it is to be understood that modifications to the various disclosed embodiments can be made, and other embodiments can be utilized, without departing from the spirit and scope of the present invention. The following detailed description is, therefore, not to be taken in a limiting sense.

The terms "link" and "linkage" are used interchangeably herein, and are intended to have their ordinary meaning as used in the field of mechanics.

As noted above, most materials have either high stiffness or high damping, but not both. In order to provide a high stiffness member with high damping, damping mechanisms that are known can be complex and rely on the addition of dampers (which often have limited effectiveness) or by active closed-loop control. Consequently, many known damping mechanisms include a large number of parts, high complexity, and may involve significant maintenance, or they may involve exotic or expensive materials.

Advantageously, the present disclosure provides a mechanical linkage that has both high stiffness and high damping, while avoiding some of the disadvantages of other known damping mechanisms. Provided in FIG. 1 is a front view of an embodiment of a damping mechanical linkage 100 in accordance with the present disclosure, and FIG. 2 provides a perspective view of the same. The damping mechanical linkage 100 disclosed herein is shown integrated into and forming a part of a structural member 102, such as an aircraft actuator linkage. The damping mechanical linkage 100 generally includes first and second end members 104a, 104b that are adapted to be attached within a segment of the structural member 102. A pair of generally parallel beams 106 interconnect the end members 104 and define a lateral space 108 therebetween. A plurality of alternating fingers 110 extend from each beam 106 into the lateral space 108. That is, the fingers 110 extending from one beam 106 are interdigitated with the fingers 110 extending from the opposite beam 106. Attached between the alternating pairs of fingers 110 (e.g. via adhesive) are a plurality of damping members 112 comprising viscoelastic material. A cover 114 can also be provided to protect the damping mechanical linkage 100. The damping mechanical linkage 100 thus provides alternating fingers 110 that are attached to two beams 106 extending along a common axis and attached to end members 104.

The end members 104, beams 106 and fingers 110 can be made of a variety of materials. Suitable materials include those that are commonly used in aerospace applications, such as metals, including steel, titanium, aluminum and alloys of the same. Other metals can also be used. Where the end members 104, beams 106 and fingers are made of metal, they can be forged, stamped, pressed, or produced by any other suitable process, whether they are formed separately or integrally, as a single unit. The end members 104, beams 106 and fingers 110 can also be made of non-metal materials, such as carbon fiber composite (e.g. unidirectional high modulus fiber), and can be fabricated in accordance with methods that are well known to those of skill in the art.

In some embodiments, the fingers 110 comprise interdigitated stiff fins that are attached alternately to the beams 106, the sides of each finger 110 being attached to the damping material 112. The number of fingers 110 can vary. In the embodiment shown in FIGS. 1 and 2, the damping mechanical linkage 100 includes five fingers 110 extending from each beam 106. A larger or smaller number of fingers 110 can be used, so long as there is at least one finger 110 extending from each beam 106 and attaching to the damping material 112. An equal number of fingers 110 can extend from each beam 106, and the fingers 110 can be arranged in an alternating or interleaved configuration, so as to minimize asymmetrical forces within the damping mechanical linkage 100.

The fingers 110 extend from each beam 106, and are fixedly attached to the damping material 112 that is disposed in the lateral space 108 between the arcuate beams 106. The fingers 110 can be bonded to the damping material 112 via a chemical adhesive, for example. Suitable adhesives for bonding a metal finger to a viscoelastic material are commercially available, and include epoxy and contact adhesives, for example. Additionally, the damping material itself can be self-adhesive in some cases. Other adhesives and other attachment methods can also be used, depending upon the materials of the damping mechanical linkage 100 and other factors. Whatever the attachment method, it is desirable that the fingers 110 be attached so that they adequately transmit shear force to the damping material 112 without damaging the damping member.

The damping material 112 can comprise a viscoelastic material that is good at absorbing and dissipating mechanical forces through deformation. In general, good damping materials have a high loss factor, whereby mechanical energy that is applied to the material causes deformation of the material, which leads to energy dissipation via heat. The loss factor of these types of materials is expressed as a unitless number (sometimes as %). For the damping mechanical linkage 100 disclosed herein, materials having a loss factor of from 0.1 to 2 are typical for currently available viscoelastic materials, and are believed to be suitable for the damping material 112. Materials with higher loss factors can also be used, and it is believed that such materials are available or are in development. In general, the higher the loss factor, the better. It will also be appreciated that high loss factor materials can be sensitive to a variety of environmental factors, such as temperature. These materials can have very different mechanical properties at different temperatures, for example. Those of skill in the art will be able to select a suitable damping material 112 for the damping mechanical linkage 100 depending on details of the application, such as operational temperature, aging and environmental exposure, etc.

With these factors in mind, there are a wide variety of commercially available viscoelastic damping materials that can be used in a damping mechanical linkage 100 in accordance with the present disclosure, depending on the application. One particular material that can be used in many conditions is a constrained layer damping polymer, available from The Soundcoat Company of Deer Park, New York and sold under the trademark Soundcoat® Dyad® 601. Other materials that can be used include chlorosulfonated polyethylene synthetic rubber, which is sold under the trademark Hypalon® 30, and various grades of polychloroprene, sold under the trademark Neoprene®, which are available from E. I. du Pont de Nemours and Company of Wilmington, Del. There are many other commercially available damping materials that can also be used.

Figure 6:
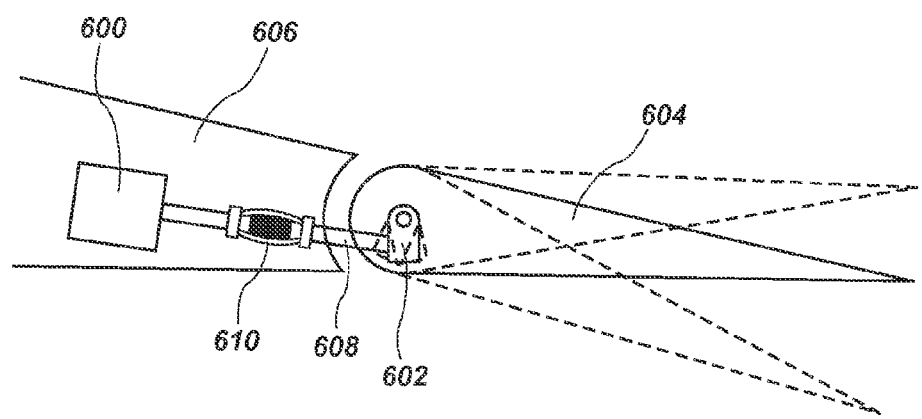
FIG. 6 is a side, cross-sectional view of a portion of an aircraft wing having a damping mechanical linkage integrated into a wing control surface actuation system.

In some embodiments, the damping mechanical linkage 100 is intended to be a part of what otherwise would usually be a continuous or uninterrupted structural member. The structural member can be almost any type of structural member. In one application, shown in FIG. 6, the structural member comprises an aircraft control surface actuator link. In this embodiment, an actuator 600 is attached to a lever arm 602 of a control surface 604 (e.g. an aileron, rudder, etc.) of an aircraft member 606. The actuator 600 is attached to the lever arm 602 via a mechanical linkage 608, which includes a damping member 610 configured in accordance with the present disclosure. In this application, impact and vibration from aerodynamic forces acting on the control surface 604 will be dampened so as to reduce wear on the actuator 600 and the surrounding aircraft structure 606.

Figure 7:
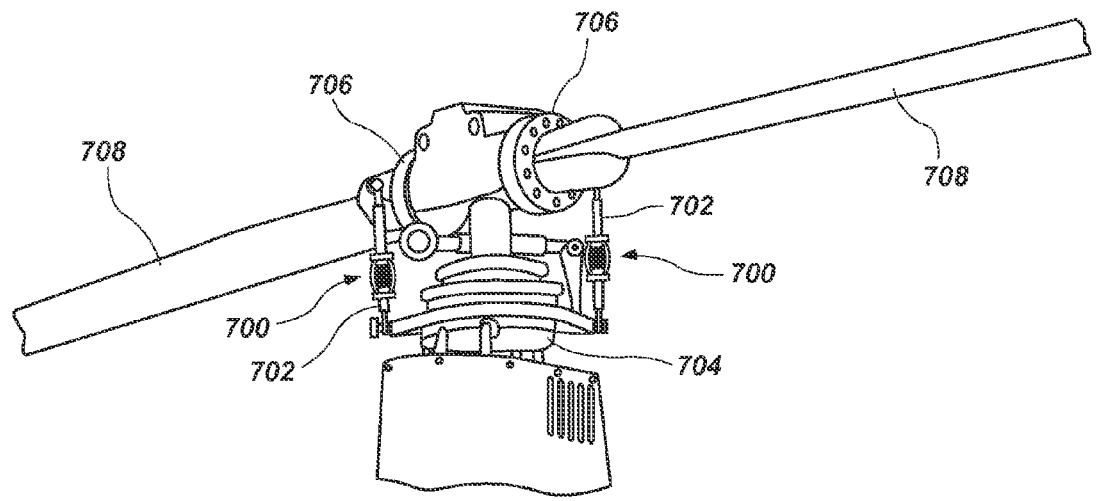
FIG. 7 is a side view of a portion of a helicopter rotor head assembly having a damping mechanical linkage integrated into a pitch link.

In another application, shown in FIG. 7, a damping mechanical linkage 700 in accordance with the present disclosure comprises part of a helicopter rotor pitch link 702. The rotor pitch link 702 extends from a swash plate assembly 704 to a rotor blade pivot 706, and operates to adjust the pitch of the rotors 708 as the rotors turn, in accordance with control system inputs. In this application, impact and vibration from the rapid rotation of the swash plate assembly 704 and from aerodynamic forces acting on the rotors 708 will be dampened so as to reduce wear on the swash plate assembly 704 and the surrounding aircraft structure. In addition to the applications shown in FIGS. 6 and 7, a damping mechanical linkage in accordance with this disclosure can also be used in other applications, such as a mounting strut for a helicopter rotor system, gear box mounting components, drive train components, precision pivoting equipment, actuators, etc. These components can be part of aircraft, spacecraft, automobiles and trucks, trains, ships, industrial machinery, and many other devices.

Referring again to FIGS. 1 and 2, the damping mechanical linkage 100 is designed primarily to deal with axial forces—either tension or compression—but can also withstand some bending and torsional forces within certain structural limits. It is designed to provide damping where the forces on the structural member 102 vary or are accompanied by impact or vibration. The damping provided by this member can help prevent damage and wear to other mechanical parts that are attached to the linkage.

The beams 106 are oppositely-curved, arcuate beams. That is, each beam 106 defines a shallow arch that curves away from the other. The opposing, stiff, shallow arches amplify elastic flexure of the beams 106 under loads, and thus apply shear stress to the damping material 112. Because of their curved shape, the beams 106 experience deflection in a predetermined direction when under stress. When a compressive load is applied to the end members 104, as illustrated by arrows 116 in FIG. 1, the beams 106 will flex outwardly (i.e. away from each other), thus drawing the interdigitated fingers 110 away from each other and imposing shear stress on the damping material 112. Under a tensile load, the beams 106 will tend to straighten, thus pushing the fingers 110 toward each other and again applying a shear stress upon the damping material 112. The damping material 112 thus absorbs some of the force applied to the mechanical linkage 100, and dissipates this force (essentially as heat). In this way, the mechanical linkage 100 provides both high stiffness and high damping.

Those of skill in the art will be aware that the stiffness and deflection characteristics of a beam or column are directly related to its shape. The beams 106 can have a constant cross-sectional shape and thickness, or the cross-sectional shape can vary. For example, the beams 106 shown in FIGS. 1 and 2 have a constant thickness from end to end. However, the beams 106 shown in FIGS. 3 and 4 have a thickness that varies from one end of the beam 106 to the other. In this case, the beams 106 are thicker toward the middle of the arch shape, and thinner at the ends, where the beams 106 attach to the end members 104. This configuration provides a beam that behaves more like a pinned beam. Alternatively, the beams 106 can be thicker at the ends and thinner toward the middle of the arch (not shown), providing a beam that behaves most like a beam with rigid end connections.

The cross-sectional shape of the beams 106 can be almost any shape. As shown in FIGS. 1 and 2, the beams 106 can be solid bars having a rectangular cross-section. However, other cross-sectional shapes can also be used, such as circular, octagonal or hexagonal, channels, I-beams, angles, box beams, tubes and others. It is desirable that the forces applied to the beams 106 fall within the elastic range of strength of the beams, and more particularly, that compressive forces on the damping mechanical linkage 100 not be high enough to cause buckling of the beams 106.

The curvature of the beams 106 can be defined by the arch rise, illustrated in FIG. 5. In geometry, a chord is a straight line between two points on an arc. In FIG. 3 two oppositely curved shallow arch beams 300 are shown. A base chord 302 is shown passing through the centerline of the beams 300 at their ends. The curvature of the beams 300 can be defined by a parameter known as the arch rise. The arch rise of the beam 300 is the height (or deflection) f of the centerline of the arch at the middle of the arch (indicated by dashed line 304), divided by half of the thickness h of the beam. This parameter is sometimes called lambda ($\lambda$) in the literature, and the arch rise is written as:

$$\lambda = f/(h/2) \qquad [1]$$

The selection of $\lambda$ has a direct effect on the stiffness of the damping linkage. The relative stiffness of a curved beam (compared to a comparable straight beam), can be given by the stiffness ratio S, according to the following formula:

$$S = 1/(1 + 8 * \lambda(^2/_5)) \qquad [2]$$

It will be apparent from the above equation that where $\lambda$ is zero, S will be equal to one. Where $\lambda$ is some value greater than zero but is relatively small, the stiffness S will be slightly less than one. Thus, a smaller arch rise $\lambda$ provides a beam 300 that has more stiffness, and therefore produces a damping linkage that provides greater stiffness but less damping. However, where $\lambda$ is larger, S will be smaller, and the damping linkage will thus provide less stiffness and more damping. It is to be appreciated that the stiffness ratio given in equation

[2] ignores the contribution of the damping material (112 in FIG. 1) to the overall stiffness of the damping mechanism. However, this contribution is likely to be relatively small, and thus is not likely to significantly increase the overall stiffness of the damping linkage.

Where $\lambda$ is greater than 2.5, the beam 300 will have a stiffness S less than 10% of a comparable straight beam. Higher values for $\lambda$ can also be used, with the understanding that stiffness decreases dramatically with the increase in $\lambda$. Consequently, the range of arch rise $\lambda$ that is likely to be used for the beams in a damping mechanical linkage as disclosed herein is generally small, and depends in part on the load range that is anticipated for the device. In a damping mechanical linkage in accordance with the present disclosure, it is believed that $\lambda$ can be in the range of 0 to about 4, and more particularly in the range of about 0.1 to about 3. In one exemplary embodiment, a damping mechanical linkage in accordance with the present disclosure has been designed with beams that are 3" long, with an arch deflection f of 0.172" and a thickness h of 0.43". This provides an arch rise $\lambda$ of 0.8 and a stiffness ratio S of 0.49. While the above discussion of arc geometry specifically discusses circular arcs, it is to be appreciated that beams with non-circular curvature can also be used in a damping mechanical linkage as disclosed herein, and the geometric characteristics and stiffness of such curves can also be determined by those of skill in the art.

Referring again to FIGS. 1 and 2, the beams 106 can be attached to the end members 104 and the fingers 110 in a variety of ways. In the embodiment of FIGS. 1 and 2, the beams 106 are pinned to the end members 104 at pins 118. Likewise, the fingers 110 can also be pin-connected to the beams 106 at pins 120. The use of pinned connections for the beams 106 and fingers 110 helps to increase damping, but also tends to reduce stiffness, and if the mechanical linkage 100 is highly loaded, the pinned connection can tend to wear out.

Alternatively, the beams and the end members can be integrally connected or integrally formed. Fixed attachment of the beams 106 to the end members 104 increases stiffness and strength of the damping mechanical linkage 100, but also reduces damping. Furthermore, fixed connections can potentially produce stress concentrations that lead to fatigue cracks if loads are large. The choice between a fixed or pinned connection generally depends on the loading of the mechanical linkage 100. For a highly loaded linkage, it may be desirable to have a fixed connection, and vice versa. Shown in FIGS. 3 and 4 is another embodiment of a damping mechanical linkage 200 in accordance with the present disclosure wherein the arched beams 206 are integrally attached to the end members 204 and the fingers 210 are integrally attached to the beams 206. As with the embodiment of FIGS. 1 and 2, this damping mechanical linkage 200 is designed to be integrated into a structural member 202, and includes first and second end members 204a, 204b, with a pair of generally parallel beams 206 that interconnect the end members 204 and define a lateral space 208 therebetween. A plurality of alternating fingers 210 extend from each beam 206 into the lateral space 208 and are interdigitated with the fingers 210 extending from the opposite beam 206. Attached between the alternating pairs of fingers 210 are a plurality of viscoelastic damping members 212. Providing the beams 206, end members 204 and fingers 210 as an integrally-formed single unit reduces the part count for the damping mechanical linkage 200 and can increase its overall strength relative to its weight. The beams 206, end members 204 and fingers 210 can be integrally attached in other ways, such as by welding, etc. The materials and characteristics of the beams 206, fingers 210, end members 204 and damping members 212 can be selected according to the same parameters that are discussed above with respect to the embodiment of FIGS. 1 and 2. More broadly, it is to be understood that the discussion herein of the embodiment of FIGS. 1 and 2 applies equally to the embodiment of FIGS. 3 and 4, unless specifically stated otherwise.

It is to be appreciated that a combination of pinned and fixed connections can be used for the beams 106, end members 104 and fingers 110, and a wide variety of attachment methods can be used. For example, the beams 106 and end members 104 can be attached with pinned connections 118, as shown in FIG. 1, while the fingers 110 are welded or otherwise integrally attached to the beams 106. Alternatively, the beams 106 and end members 104 can be integrally attached, as shown in FIG. 3, while the fingers 110 are pin-connected to the beams 106 at pinned connections 120, as shown in FIG. 1. Other combinations can also be used.

The size of the damping mechanical linkage 100 disclosed herein can vary, depending upon its application. As noted above, an embodiment of this device has been designed with beams 106 that are 3" long, with an arc height f of 0.172". In this embodiment the beams 106 are of flat steel bar that is 0.43" thick. The fingers 110 are also of steel, 0.5" long, 1.0" wide and 0.125" thick, and the damping material 112 is of Neoprene®, each piece being about 0.45" long, 1.0" wide and from 0.05" to 0.25" thick, with 0.125" thick being a likely dimension. This thickness can be a variable that is optimized for each given case. The end members 104 in this embodiment are also of steel, and measure about 1" wide, 1" high, and 1" thick. These end members 104 are configured to attach to a structural member 102 having a cross-section that is about 1"×1". Analytical performance of this particular embodiment shows that it is expected to have a stiffness of 4 million lb per inch of deflection of the beams, and should support a maximum load of 30,000 lb tension or compression.

The size of the embodiment of the damping mechanical linkage 100 described above makes the damping mechanical linkage about 5" long, 1.27" wide and 1" thick. This particular embodiment was designed for an aircraft rudder actuator link. Actual embodiments of this device can be smaller or larger than this. For example, it is believed that probable applications for this device can be much larger than the size indicated here, and can also be smaller in other applications.

Designing a damping mechanical linkage in accordance with this disclosure can involve first identifying major design requirements, including maximum static tension and compression loads, stiffness required, definition of the dynamic loads, and the attenuation required. The arches can be designed to have the largest arch rise while maintaining a desired stiffness. The designer can verify the load carrying capability in tension by calculating the stress due to maximum bending in the arches, and also verify that the buckling load of the arches exceeds the maximum anticipated compressive load. Finally, the designer can determine the separation dimension for the two arches. Larger separation allows for a greater volume of damping material, which can improve the vibration attenuation. At the same time, larger beam separation tends to increase the dimensions and weight of the member, which is a design trade-off to be considered.

Figure 8:
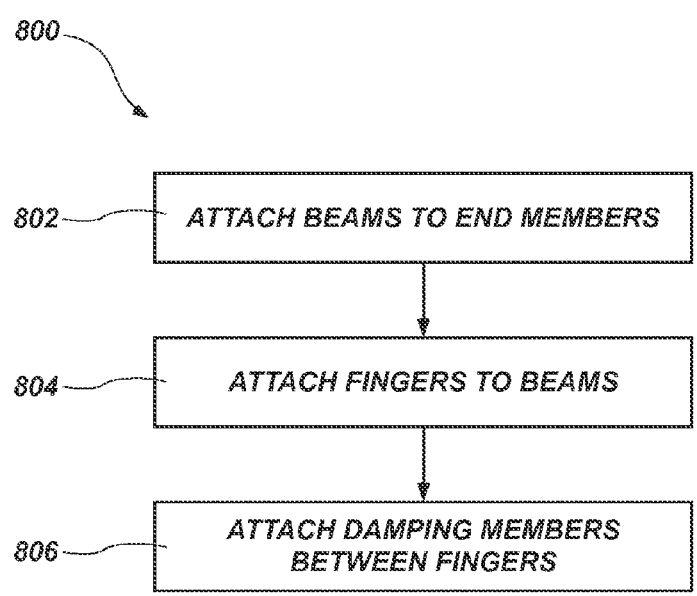
FIG. 8 is a flowchart of a method for making a damping structural member in accordance with the present disclosure.

Various fabrication methods can be used to facilitate the fabrication and assembly of the damping member. A flowchart showing the steps in an embodiment of a method 800 for making a damping structural member in accordance with the present disclosure is provided in FIG. 8. In general, the method involves attaching the beams to the end members 802, attaching the fingers to the beams 804 and attaching a damping member between adjacent fingers 806.

More particularly, with reference also to FIG. 1, the method involves attaching the end members 104 to two arcuate beams 106. As noted above, the end members 104 can be integrally attached to or integrally formed with the arcuate beams 106, or they can be separate elements to which the beams 106 are then attached. Likewise, the fingers 110 can be integral with the arcuate beams 106, or they can be separate elements that are then attached to the beams 106 to extend into the lateral space 108 between the beams. For example, the arches and fingers can be machined from a single piece of material (e.g. steel, aluminum, titanium and alloys of the same), thus providing arches with integral comb fingers. Different fabrication methods can be used for different materials. Advantageously, both arches can be identical in design, if desired. Where the fingers 110 are separate elements that are attached to the beams 106, the fingers 110 can be attached to the beams 106 via pinned connections 120 as shown in FIGS. 1 and 2, or they can be attached in other ways, such as via a dovetail connection (not shown). Damping members 112 are attached or adhered between adjacent fingers 110, such as bonding via a chemical adhesive, as discussed above. The order of the steps shown in FIG. 8 can vary, depending on the design. For example, where the fingers 110 are pin-connected to the arches 106, alternating damping layers 112 and fingers 110 can be attached together first (step 806), and then the assembly of fingers 110 and damping members 112 can be installed into (i.e. attached to) the arches 106 via attachment pins. With any of the fabrication methods discussed herein, the fingers 110 extend into the lateral space 108 in an interleaved, alternating configuration, and serve to transmit axial stress in the beam—either compressive or tensile stress—as shear stress to the damping member 112 in response to deflection of the beams 106.

The damping mechanical linkage 100 can also include a cover 114 attached at the end members 104 and surrounding the arcuate beams 106, the fingers 110 and the damping material 112, in order to protect the mechanical link from chemicals, sunlight, or other potentially degrading elements or environmental conditions. This cover can be configured in a variety of ways. For example, the cover 114 can be a shrink-wrapped polymer or a heat-shrink tube that is placed around the damping mechanical linkage 100. It is believed that almost any cover 114 will be suitable so long as it is not so stiff that it would restrict the bending of the beams 106. At the same time, the damping mechanical linkage 100 can function without a cover. To complete its installation, the damping mechanical linkage 100 can then be attached to parts of a structural member (102 in FIG. 1), to provide both damping and load bearing for that member.

The damping mechanical linkage 100 disclosed herein is compact and operates passively with no electronics. The interdigitated fingers 110 are bonded to a viscoelastic material 110 that absorbs vibrations. The fingers 110 are connected to beams or arms 106 that are typically in tension or compression, with two end members 104. The linkage 100 absorbs axial force and vibrations by imposing a shear load across the viscoelastic damping material 112. In one embodiment, the beams or arms 106 are curved, defining a shallow arc shape.

The geometry of the shallow arches provides several benefits. First, it provides mechanical amplification of deformation under compressive or tensile forces, and converts that amplified deformation to a form well suited to dissipation of energy through viscoelastic material damping. Unlike some other damping devices, which provide damping in-line with a load that is upon the member, the present device provides damping transverse to the load line. By using opposing stiff shallow arches to amplify deformation and apply shear to a damping material, this mechanical linkage provides both high stiffness and high damping. It uses the natural deformation of the arch to mechanically amplify the in-line displacement, and not only applies the amplified motion to the damping material, but also applies it in an effective manner (i.e. shear) for damping using this type of damping material.

Figure 9:
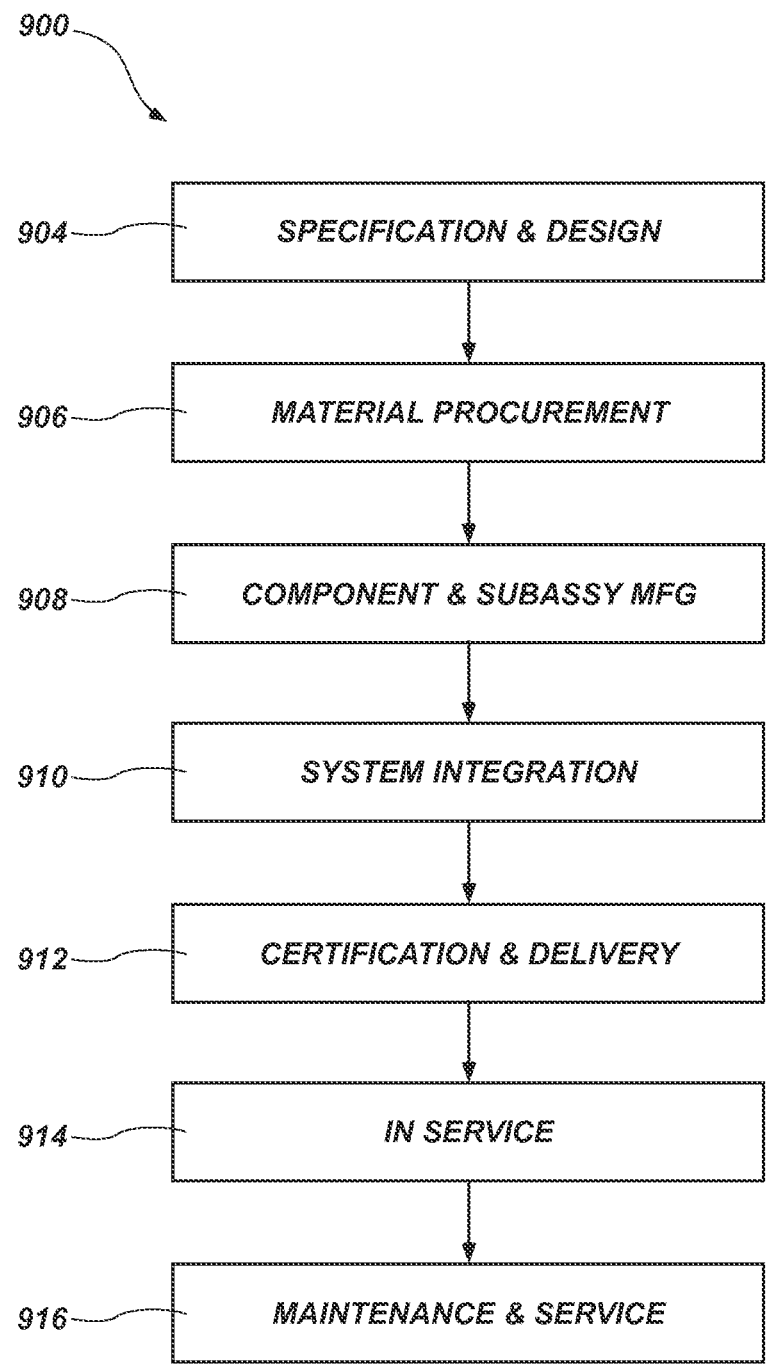
FIG. 9 is a flow diagram of an aircraft production and service methodology.
Figure 10:
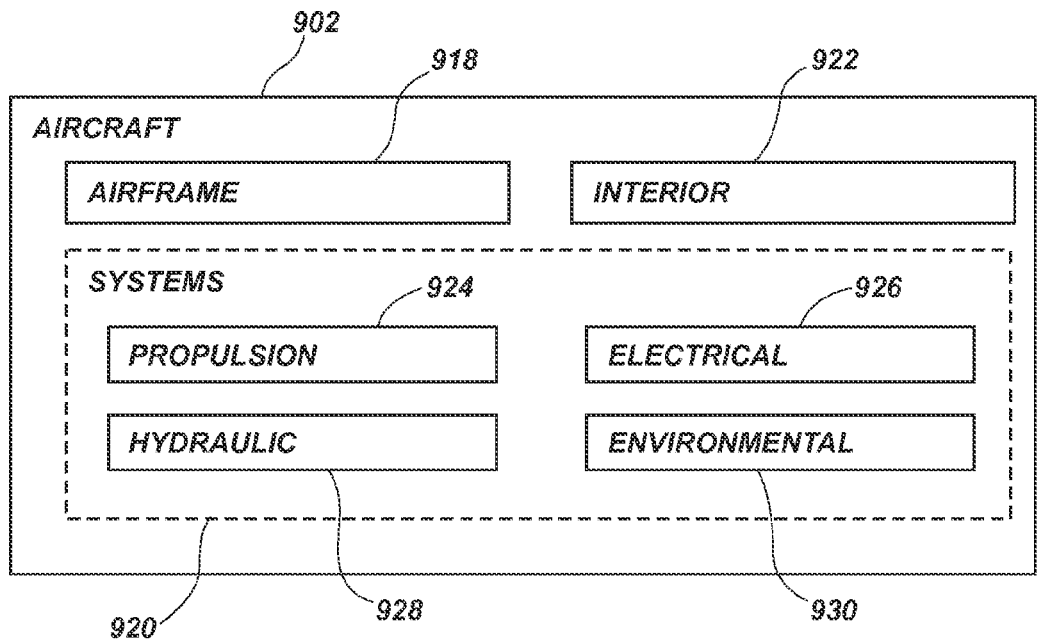
FIG. 10 is a block diagram of an aircraft.

Embodiments of the disclosure may be described in the context of an aircraft manufacturing and service method 900 as shown in FIG. 9, for an aircraft 902 as shown in FIG. 10. During pre-production, exemplary method 900 may include specification and design 904 of the aircraft 902 and material procurement 906. During production, component and subassembly manufacturing 908 and system integration 910 of the aircraft 902 takes place. Thereafter, the aircraft 902 may go through certification and delivery 912 in order to be placed in service 914. While in service by a customer, the aircraft 902 is scheduled for routine maintenance and service 916 (which may also include modification, reconfiguration, refurbishment, and so on).

Each of the processes of method 900 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 10, an aerospace vehicle such as an aircraft 902 produced by exemplary method 900 may include an airframe 918 with a plurality of systems 920 and an interior 922. Examples of high-level systems 920 include one or more of a propulsion system 924, an electrical system 926, a hydraulic system 928, and an environmental system 930. Any number of other systems may be included. Although an aircraft is given as an example of an aerospace application for the present disclosure, it is to be understood that this is only one example of an aerospace application. Additionally, while an aerospace example is shown, the principles of the invention may be applied to other industries, such as the automotive industry, for example.

Figure 11:
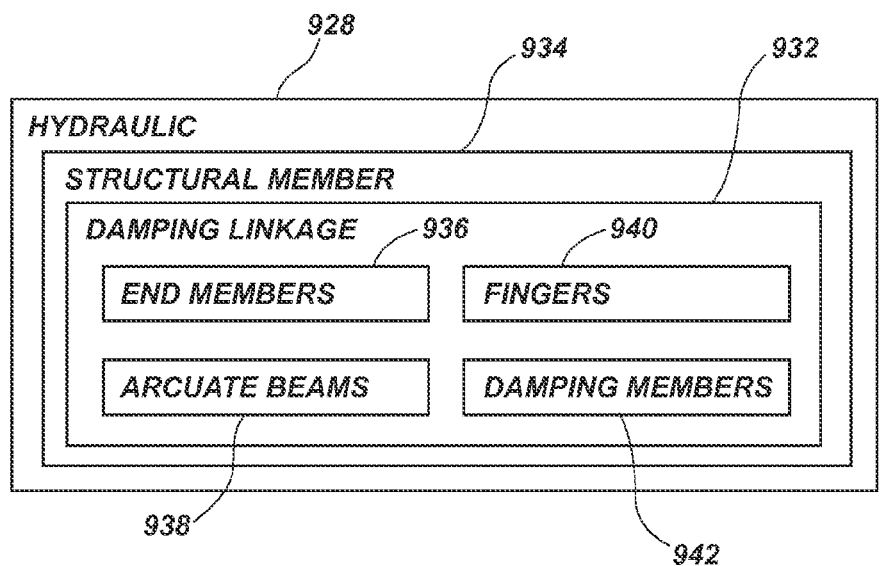
FIG. 11 is a more detailed block diagram of the hydraulic system portion of FIG. 10, showing the elements of a damping mechanical linkage in accordance with the present disclosure.

In the particular embodiment shown in FIG. 11, the aircraft 902 is shown having a damping mechanical linkage 932 that is part of a structural member 934 that is associated with the hydraulic system 926. Such a structural member can be an actuator linkage for a rudder, aileron or other control surface of the aircraft 902, for example. It is to be appreciated, however, that this is only one exemplary application. A damping mechanical linkage in accordance with this disclosure can be associated with other systems 920, including the electrical system 926, environmental system 930 or propulsion system 924 of the aircraft 902, and further, could be used in the airframe 918 or interior 922 of the aircraft.

As discussed herein, the damping mechanical linkage 934 includes end members 936, which attach to the structural member 934 and also interconnect the arcuate beams 938. Fingers 940 extend from the arcuate beams into the lateral space between the beams, and damping members 942 are attached between the fingers.

Apparatus and methods embodied herein may be employed during any one or more of the stages of the production and service method 900, shown in FIG. 9. For example, components or subassemblies corresponding to production process 908 may be fabricated or manufactured in a manner similar to components or subassemblies produced while the aircraft 902 is in service. Also, one or more apparatus embodiments, method embodiments, or a combination thereof may be utilized during the production stages 908 and 910, for example, by substantially expediting assembly of or reducing the cost of an aircraft 902. Similarly, one or more of apparatus embodiments, method embodiments, or a combination thereof may be utilized while the aircraft 902 is in service, for example and without limitation, to maintenance and service 916.

As noted above, embodiments of the device disclosed herein have application in aircraft systems, such as in control surface actuators, mounting struts for helicopter rotor systems, rotor pivot link assemblies in rotary wing aircraft, etc. Many other applications are also possible. For example, it is believed that a damping mechanical linkage in accordance with the present disclosure can be used in spacecraft, such as for the mounting of precision pointing equipment, etc. It can also be used in drive train components, gear box mounting components, etc., and can be associated with a wide range of systems, including aircraft, spacecraft, automobiles and trucks, ships, trains, industrial machinery, etc. In general, a damping mechanical linkage in accordance with this disclosure can be used in any application where both high stiffness and high damping are desired in a mechanical linkage.

Figure 12:
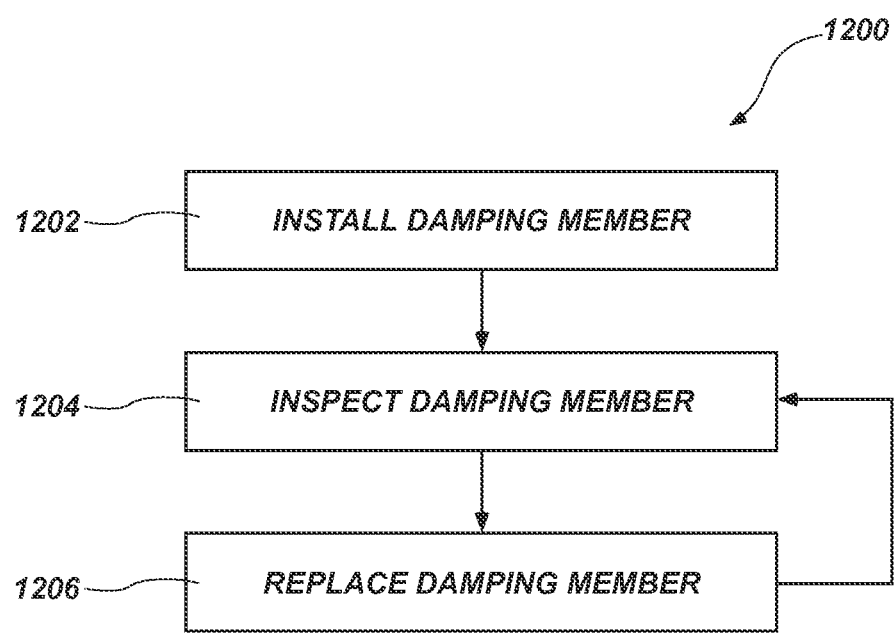
FIG. 12 is a flowchart of steps in a method of using a damping mechanical linkage in accordance with the present disclosure.

In accordance with the variety of possible applications for the damping mechanical linkage 100, such as those discussed above, a flowchart showing steps in an exemplary method 1200 of using a damping mechanical linkage in accordance with the present disclosure is provided in FIG. 12. A first step in using the device is to install the damping member in a structural member 1202. This can be a structural truss member, for example, which is expected to experience axial forces (i.e. tension and/or compression). The operation of the damping member is passive, as a structural member. A user (e.g. maintenance personnel) can inspect the member periodically 1204, to check for potential failure mechanisms such as fatigue cracks in the arches or degradation of the damping material due to aging or environmental factors. Inspection can also involve removal and replacement of a cover over the damping member, if one is present. Finally, a maintenance worker can replace the damping member 1206, if desired. The inspection and replacement steps can be repeated, as indicated by arrow 1208.

Although the mechanical linkage with high stiffness and high damping disclosed herein has been described in terms of certain specific embodiments, it is to be understood that other embodiments that are apparent to those of ordinary skill in the art, including embodiments that do not provide all of the features set forth herein, are also within the scope of this disclosure. Those skilled in the art will recognize that the teachings contained herein can be practiced with various modifications within the scope of the claims. Accordingly, the scope of the present disclosure is defined only by reference to the appended claims and equivalents thereof.

What is claimed is:

1. A mechanical linkage adapted to be axially loaded in tension or compression, comprising:
    first and second end members;
    a pair of generally parallel, oppositely curved, arcuate beams, having a long dimension aligned with a load axis, the first and second end members disposed at opposing longitudinal ends of the beams, the beams interconnecting the first and second end members and defining a lateral space therebetween, the beams configured to deflect in first respective opposing directions under a compressive load applied to the end members, and to deflect in second respective opposing directions under a tensile load applied to the end members;
    a plurality of alternating fingers, oriented substantially transverse to the load axis, extending from each beam into the lateral space and arranged in adjacent pairs of fingers, the fingers associated with each arcuate beam being configured to move laterally in opposing directions in concert with the respective opposite deflection of the associated arcuate beam; and
    a damping member, attached between each finger of each adjacent pair of fingers, within the lateral space, each damping member configured to resist the lateral motion of the adjacent fingers and thereby absorb a portion of the axial load upon the mechanical linkage.

2. A mechanical linkage in accordance with claim 1, wherein the damping member comprises viscoelastic material.

3. A mechanical linkage in accordance with claim 2, wherein the viscoelastic material is selected from the group consisting of constrained layer damping polymer, chlorosulfonated polyethylene synthetic rubber and polychloroprene.

4. A mechanical linkage in accordance with claim 1, wherein the beams define oppositely oriented arcs having an arch rise of from about 0.1 to about 3.

5. A mechanical linkage in accordance with claim 1, wherein the beams, fingers and end members are integrally formed.

6. A mechanical linkage in accordance with claim 1, wherein the beams are pinned to the end members.

7. A mechanical linkage in accordance with claim 1, wherein the first and second end members, beams and fingers are of a material selected from the group consisting of steel, titanium, aluminum, and alloys thereof, fiberglass epoxy, carbon fiber composite and combinations of any of the above.

8. A mechanical linkage in accordance with claim 1, further comprising a cover, disposed around the beams, the fingers and the damping member.

9. A mechanical linkage in accordance with claim 1, wherein the arcuate beams have a substantially constant cross-sectional shape.

10. A damping mechanical linkage, comprising:
    first and second end members;
    a pair of generally parallel, oppositely curved, arcuate beams, attached between the first and second end members and substantially aligned with a load axis, defining a symmetrical lateral space therebetween, the beams configured to deflect in opposing lateral directions under compressive and tensile loads, respectively, applied to the end members along the load axis;
    a plurality of parallel fingers, extending substantially transversely from each beam into the lateral space and arranged in interleaved adjacent pairs, the fingers moving laterally in opposing respective directions in concert with the deflection of the respective arcuate beams; and
    a damping member, affixed between each adjacent pair of fingers within the lateral space, opposing lateral motion of the adjacent fingers imposing a shear force on the damping member.

11. A damping mechanical linkage in accordance with claim 10, wherein the damping member comprises viscoelastic material.

12. A damping mechanical linkage in accordance with claim 11, wherein the viscoelastic material is selected from the group consisting of constrained layer damping polymer, chlorosulfonated polyethylene synthetic rubber and polychloroprene.

13. A damping mechanical linkage in accordance with claim 10, wherein the beams define oppositely oriented arcs having an arch rise of from about 0.1 to about 3.

14. A damping mechanical linkage in accordance with claim 10, wherein the beams, fingers and end members are integrally formed.

15. A damping mechanical linkage in accordance with claim 10, wherein the beams are pin-connected to the end members.

16. A damping mechanical linkage in accordance with claim 10, wherein the fingers are pin-connected to the respective beams.

17. A damping mechanical linkage in accordance with claim 10, further comprising a cover, disposed around the beams, the fingers and the damping member.

18. A damping mechanical linkage in accordance with claim 10, wherein the arcuate beams have a substantially constant cross-sectional shape.

* * * * *